(12) United States Patent
Zhang et al.

(10) Patent No.: US 11,340,999 B2
(45) Date of Patent: May 24, 2022

(54) FAST RESTORATION METHOD FROM INODE BASED BACKUP TO PATH BASED STRUCTURE

(71) Applicant: EMC IP Holding Company LLC, Hopkinton, MA (US)

(72) Inventors: Wuyun Zhang, Chengdu (CN); Zhibin Zhang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 547 days.

(21) Appl. No.: 15/887,737

(22) Filed: Feb. 2, 2018

(65) Prior Publication Data
US 2019/0243728 A1 Aug. 8, 2019

(51) Int. Cl.
*G06F 11/14* (2006.01)
*G06F 16/13* (2019.01)
*G06F 16/172* (2019.01)

(52) U.S. Cl.
CPC ...... *G06F 11/1469* (2013.01); *G06F 11/1451* (2013.01); *G06F 11/1464* (2013.01); *G06F 16/13* (2019.01); *G06F 16/172* (2019.01)

(58) Field of Classification Search
CPC ............ G06F 11/1469; G06F 11/1464; G06F 11/1451; G06F 16/172; G06F 16/13; G06F 16/11; G06F 16/113; G06F 16/122; G06F 16/182; G06F 16/907
See application file for complete search history.

(56) References Cited

U.S. PATENT DOCUMENTS

| | | | | |
|---|---|---|---|---|
| 7,694,103 | B1 * | 4/2010 | Kushwah | G06F 11/1469 711/171 |
| 8,661,068 | B1 * | 2/2014 | Seibel | G06F 16/172 707/825 |
| 9,069,792 | B1 * | 6/2015 | Craighead | G06F 16/172 |
| 2007/0185852 | A1 * | 8/2007 | Erofeev | G06F 16/166 |
| 2007/0294589 | A1 * | 12/2007 | Jarvis | G06F 11/1435 714/42 |
| 2009/0228744 | A1 * | 9/2009 | Deenadhayalan | G06F 11/1004 714/48 |
| 2013/0318086 | A1 * | 11/2013 | Adkins | G06F 16/134 707/737 |
| 2013/0326152 | A1 * | 12/2013 | Loaiza | G06F 12/0802 711/141 |
| 2017/0123937 | A1 * | 5/2017 | Iwasaki | G06F 11/1448 |

* cited by examiner

*Primary Examiner* — Pierre M Vital
*Assistant Examiner* — Andalib F Lodhi
(74) *Attorney, Agent, or Firm* — Womble Bond Dickinson (US) LLP

(57) ABSTRACT

One embodiment is related to a method for restoring an inode based backup to a path based structure, comprising: receiving a path to be restored; determining one or more selected inodes, wherein metadata associated with the one or more selected inodes is to be used in the restoration; generating a sendmap structure that is indicative of the selected inodes; restoring a first file; and determining whether an inode number of the first file, which identifies an inode of the first file, and its associated metadata are available in a metadata cache, and if so: using the inode number of the first file and its associated metadata in the metadata cache in the restoration of the first file.

24 Claims, 7 Drawing Sheets

FAST RESTORATION METHOD FROM INODE BASED BACKUP TO PATH BASED STRUCTURE

FIELD OF THE INVENTION

Embodiments of the disclosure are related to electronic devices, and more particularly, to a method, apparatus, and system for restoring an inode based backup to a path based structure.

BACKGROUND

From the perspective of file systems, files and directories are organized according to a path based structure, which presents the most intuitive view to the end user.

Some file systems use the inode data structure to organize storage space. Every file and directory (folder, including subdirectory/subfolder) is associated with an inode, which is identified by a unique inode number. An inode number can be a 32-bit unsigned integer (8 hex digits) (4 bits corresponds to 1 hex digit). Each inode may comprise metadata for the file or directory, such as times of change, access, or creation, owner and permission data, container identifier, offset, etc.

Some network-attached storage (NAS) systems (e.g., NetApp systems) send files and directories in a Network Data Management Protocol (NDMP) data stream in the order of inode numbers when transferring data across the network. Furthermore, some data backup and recovery software (e.g., Dell EMC Avamar) saves files and directories based on their inode numbers. In such inode based backups, data are organized by an inode hierarchy structure.

Sometimes the end user would like to restore data from an inode based backup to a file system. For example, the end user may want to restore an Avamar NetApp backup to a Linux file system or a Windows file system. To accomplish the restoration, converting the backup data from an inode based structure to a path based structure is essential. Conventional methods for restoring from an inode based backup to a path based structure requires traversing the file tree repeatedly to obtain metadata associated with specific inode numbers. These conventional methods are time consuming, and can be extremely slow when there are a large number of files to restore.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure are related to a method, apparatus, and system for restoring an inode based backup to a path based structure. The operations comprise: receiving a path to be restored; determining one or more selected inodes, wherein metadata associated with the one or more selected inodes is to be used in the restoration; generating a sendmap structure that is indicative of the selected inodes; restoring a first file; and determining whether an inode number of the first file, which identifies an inode of the first file, and its associated metadata are available in a metadata cache, and if so: using the inode number of the first file and its associated metadata in the metadata cache in the restoration of the first file.

File Tree and Directory Tree

In an inode based backup, files are organized by their inode numbers and are saved to a tree structure called a "file tree." Similarly, directories are organized are organized by their inode numbers and are saved to a tree structure called a "directory tree." Leaves (at the bottom level) of the file tree and the directory tree contain metadata associated with respective inodes.

Figure 1A:
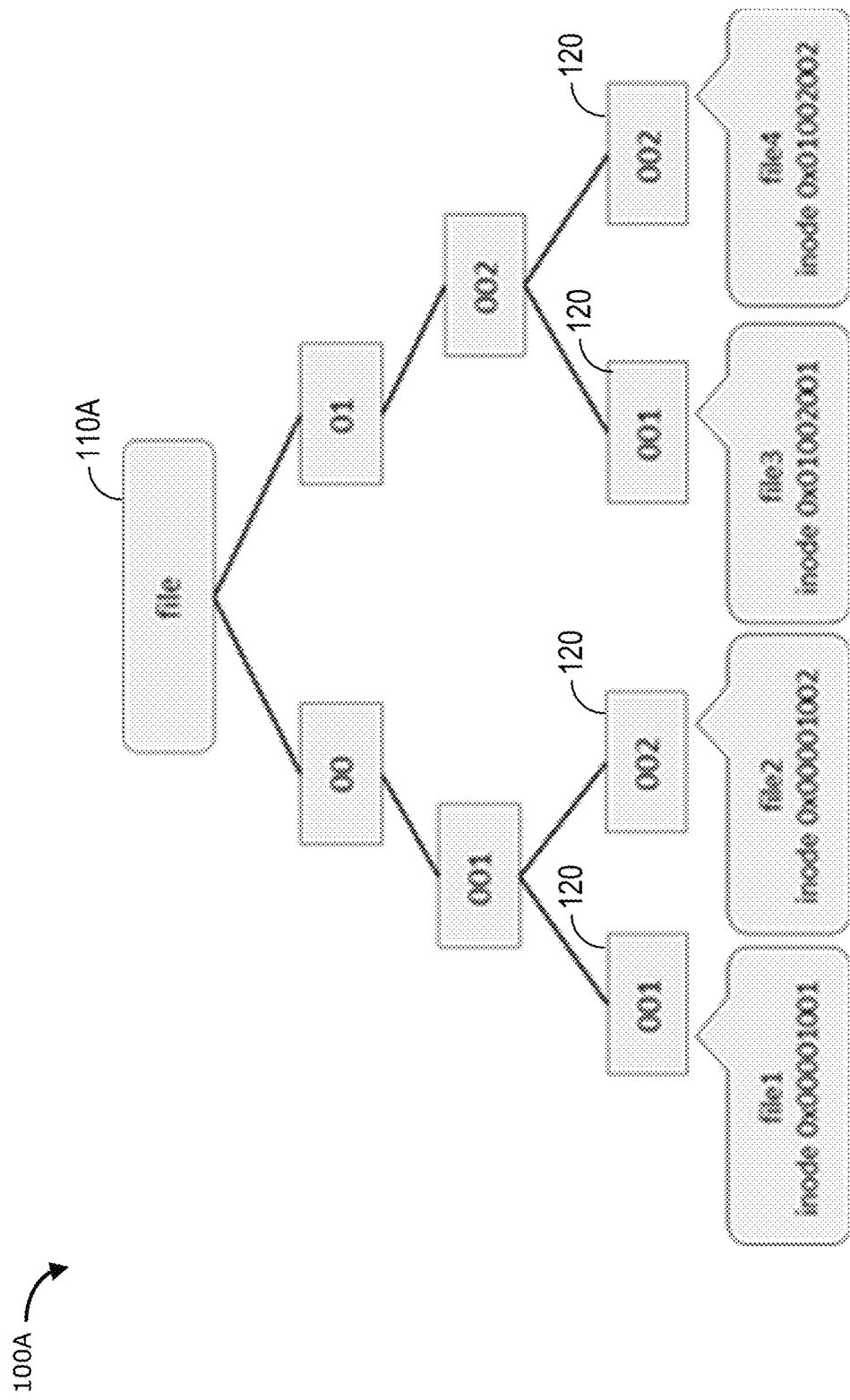
FIGS. 1A and 1B are diagrams illustrating an example file tree and directory tree, respectively.
Figure 1B:
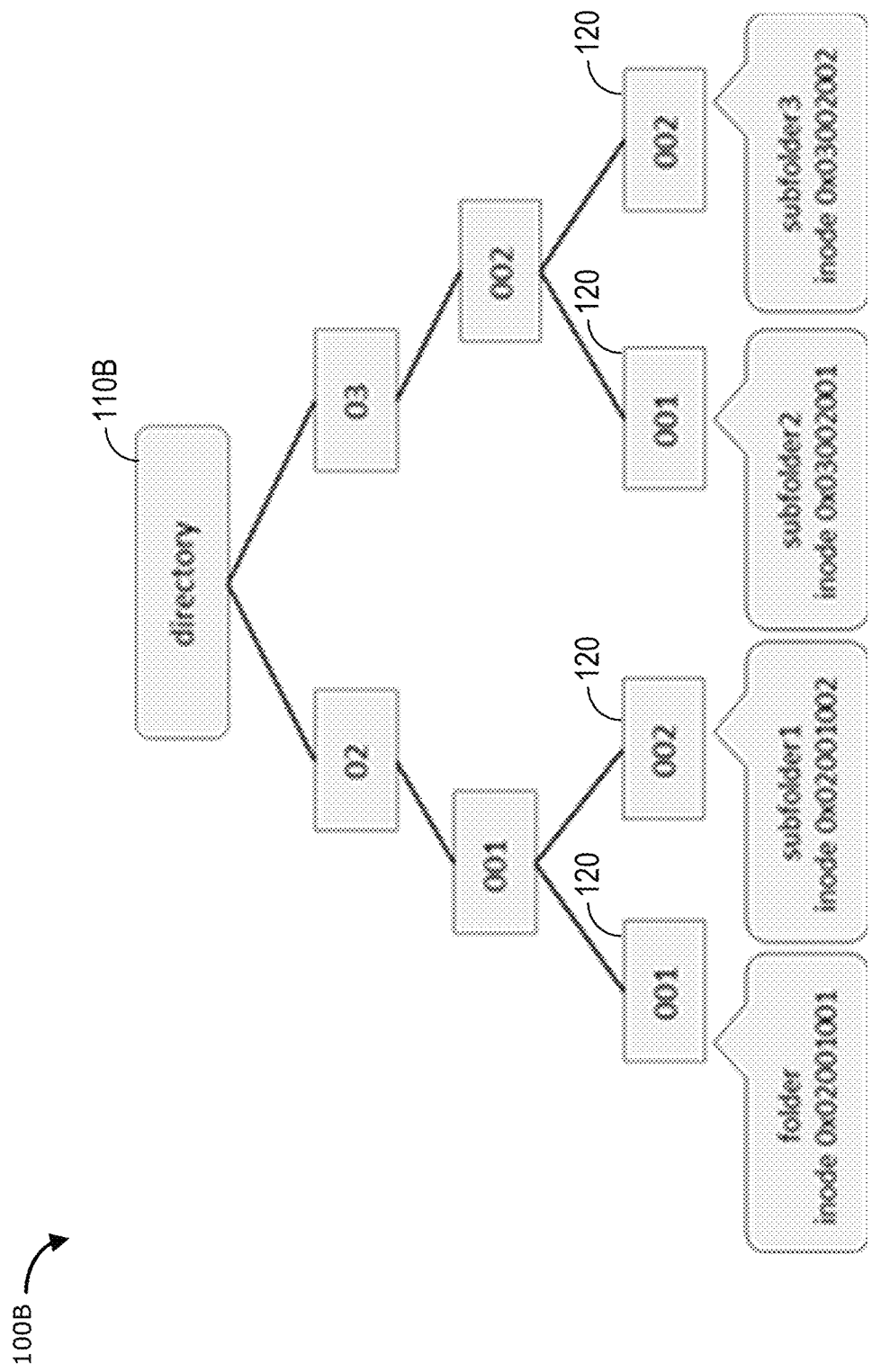

Referring to FIGS. 1A and 1B, diagrams illustrating an example file tree 100A and a directory tree 100B, respectively, are shown. It should be appreciated that the inode numbers are represented in hex digits in FIGS. 1A and 1B. As can be seen in FIGS. 1A and 1B, the top level 110A, 110B of the file tree 100A and of the directory tree 100B indicates the type of the tree. The level directly below the top level (the 2nd level) is organized based on the first 2 hex digits (i.e., 8 bits) of the inode numbers. The next level down (the 3rd level) is organized based on the next 3 hex digits (i.e., 12 bits) of the inode numbers. At the bottom level, the leaves 120 are identified by the last 3 hex digits (i.e., 12 bits) of the inode numbers. The metadata associated with each inode is stored at the leaves 120.

Generating Sendmap

In one embodiment of the disclosure, a sendmap for a restoration operation refers to a bitmap structure to store the status of file/directory inode selection for the restoration process. In one embodiment, the sendmap may be stored in a memory of a data processing system (e.g., a data protection server). Each bit in the sendmap corresponds to an inode. For example, the first bit of the sendmap corresponds to the inode numbered 1 (in decimal), and the second bit of the sendmap corresponds to the inode numbered 2 (in decimal), etc. The value of each bit in the sendmap indicates the selection status of the corresponding inode. For example, the value of 1 indicates the corresponding inode is selected, and the value of 0 indicates the corresponding inode is not selected. An inode is selected when the metadata associated with the inode is to be used in the restoration, and vice versa. It should be appreciated that the arrangement of bits in the sendmap and the definition of the binary values in the sendmap described above are illustrative, and do not limit the disclosure. Other bit arrangements and value definitions may also be used.

Figure 2:
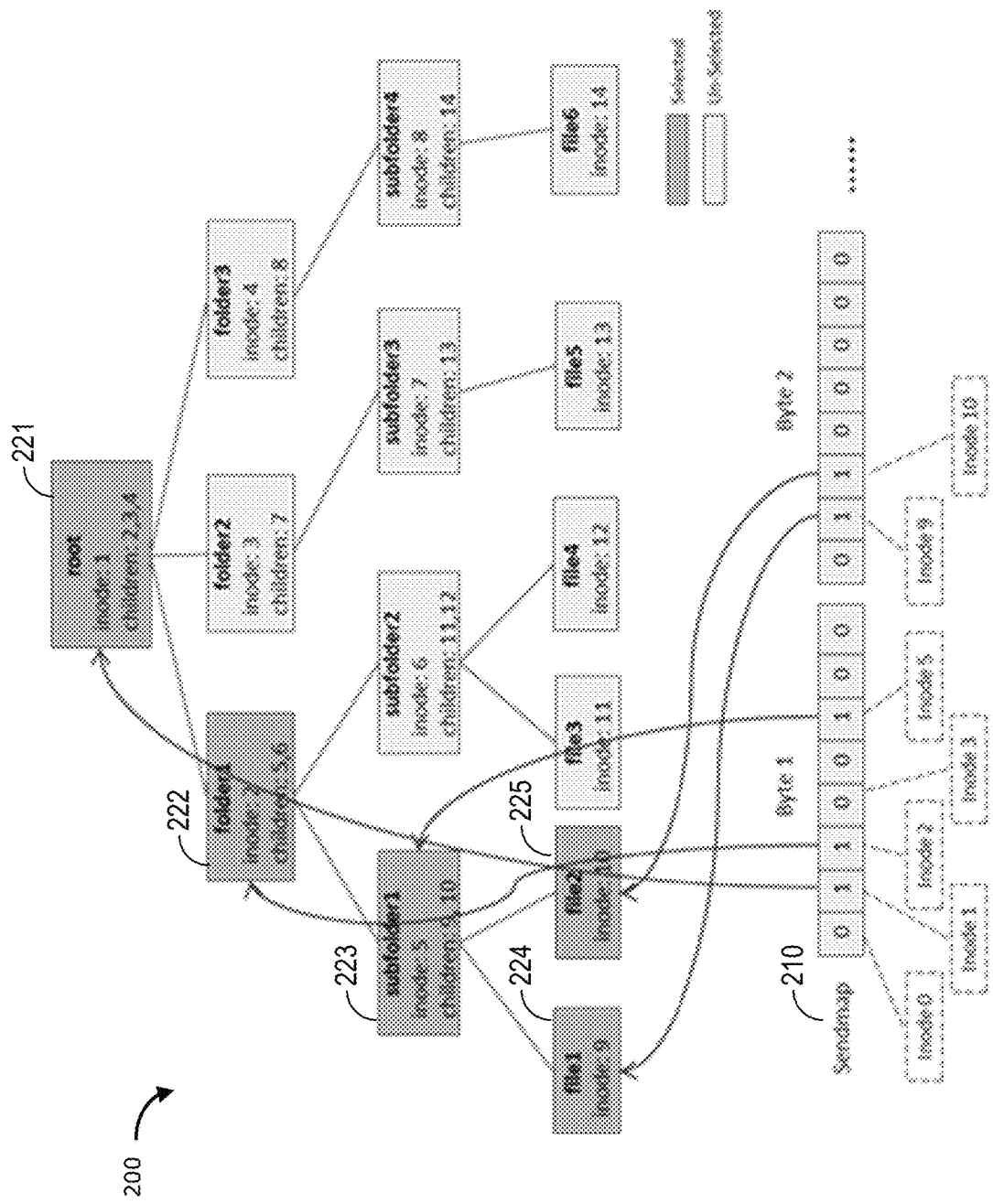
FIG. 2 is a diagram illustrating an example method for generating a sendmap structure, according to one embodiment of the invention.

Referring to FIG. 2, a diagram illustrating an example method 200 for generating a sendmap structure, according to one embodiment of the invention, is shown. In this example, the end user has specified the path to be restored from the backup: /root/folder1/subfolder1/. To obtain the inode information, the restoration process may comprise traversing from the "root" folder 221 to the target path according to the perspective of the path structure. The inode numbers of the files and directories that need to be restored are obtained during the traversing process. The traversing process involves searching the directory tree to obtain content of each directory (inode numbers and names of child files and subdirectories).

As can be seen in FIG. 2, metadata associated with the directories "root" 221 (inode number 1 in decimal), "folder1" 222 (inode number 2 in decimal), and "subfolder1" 223 (inode number 5 in decimal), and files "file1" 224 (inode number 9 in decimal), and "file2" 225 (inode number 10 in decimal) is required in the restoration. Accordingly, inodes with inode numbers 1, 2, 5, 9, and 10 (in decimal) are selected for this restoration. The corresponding bits (that is, the first, second, fifth, ninth, and tenth bits) in the sendmap 210 are set to 1, and the other bits in the sendmap 210 are set to 0, as they correspond to unselected inodes.

Generating Metadata Cache

The metadata cache is a mapping structure that stores inode numbers and their respective associated metadata for later use. The metadata cache may be generated during the restoration process. Retrieving the metadata from the file/directory tree is slower than retrieving the same metadata from the metadata cache, as long as the requested metadata is available from the metadata cache. Generally only selected inodes and their corresponding metadata are stored in the metadata cache. When metadata associated with a specific inode number is required during the restoration process, the metadata cache may be checked to determine whether the requested metadata is already cached in the metadata cache and can be retrieved from the metadata cache directly. If the requested metadata is not available in the metadata cache, the metadata needs to be retrieved from the file/directory tree. While retrieving the requested metadata from the corresponding leave in the file/directory tree, the restoration process also checks other leaves that share the second level sub-path (e.g., same first 5 hex digits/20 bits in the inode numbers) with the leaf that contains the requested metadata. If any of these other leaves corresponds to a selected inode number, as determined based on the sendmap, the metadata stored in such a leaf is retrieved and cached in the metadata cache together with its associated inode number. Therefore, with the assistance of the metadata cache, each second level sub-path (corresponding to the first 5 hex digits of inode numbers) in the file/directory tree needs to be traversed only once during the restoration process.

Figure 3:
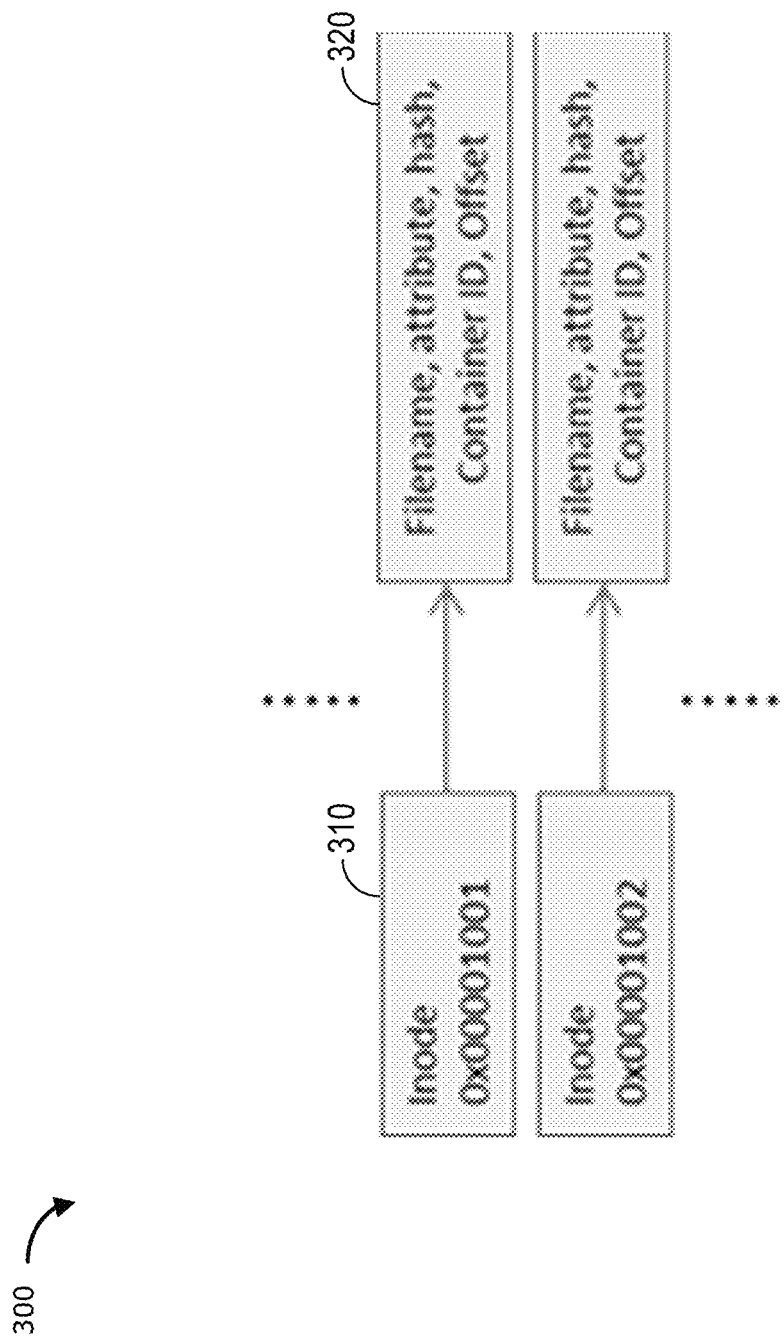
FIG. 3 is a diagram illustrating an example metadata cache, according to one embodiment of the disclosure.

Referring to FIG. 3, a diagram illustrating an example metadata cache 300, according to one embodiment of the disclosure, is shown. The metadata cache 300 comprises inode numbers 310 and metadata 320 associated with each inode number. The metadata 320 may comprise a filename, attributes, hash, container identifier, offset, etc.

Figure 4:
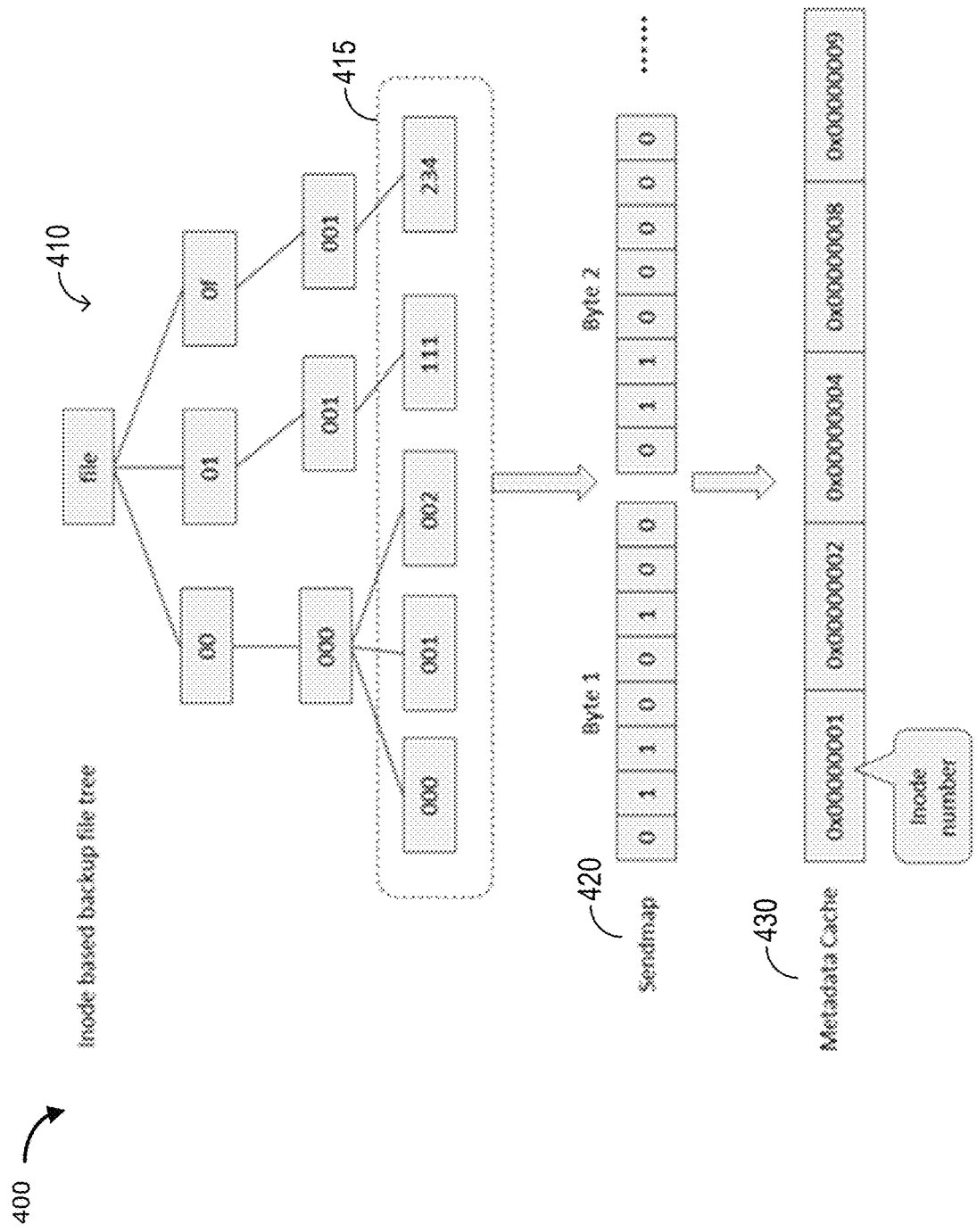
FIG. 4 is a diagram illustrating an example method for generating a metadata cache, according to one embodiment of the disclosure.

Referring to FIG. 4, a diagram illustrating an example method 400 for generating a metadata cache, according to one embodiment of the disclosure, is shown. Based on the sendmap 420 (in particular, bits in the sendmap 420 that have a value of 1 indicating selection of the corresponding inodes), metadata associated with the selected inode numbers, which is retrieved from the leaves 415 of the file tree 410, is stored in the metadata cache 430 together with the respective inode numbers. In particular, the restoration process traverses the file tree 410 to retrieve requested metadata associated with an inode number that is not already available in the metadata cache 430. At the level directly above the leaves (i.e., second level sub-path), which corresponds to the first 5 hex digits of the inode numbers, a list of the leaves that have inode numbers beginning with the same corresponding first 5 hex digits can be obtained. Each leaf is checked against the sendmap 420 to determine whether the corresponding inode is selected. Accordingly, metadata associated with selected inode numbers is stored in the metadata cache 430, while metadata associated with unselected inode numbers is not stored in the metadata cache 430.

Although FIG. 4 illustrates only the insertion of file inodes and metadata into the metadata cache, a person skilled in the art would understand that the insertion of directory inodes and metadata into the metadata cache can be accomplished in a similar fashion.

Figure 5:
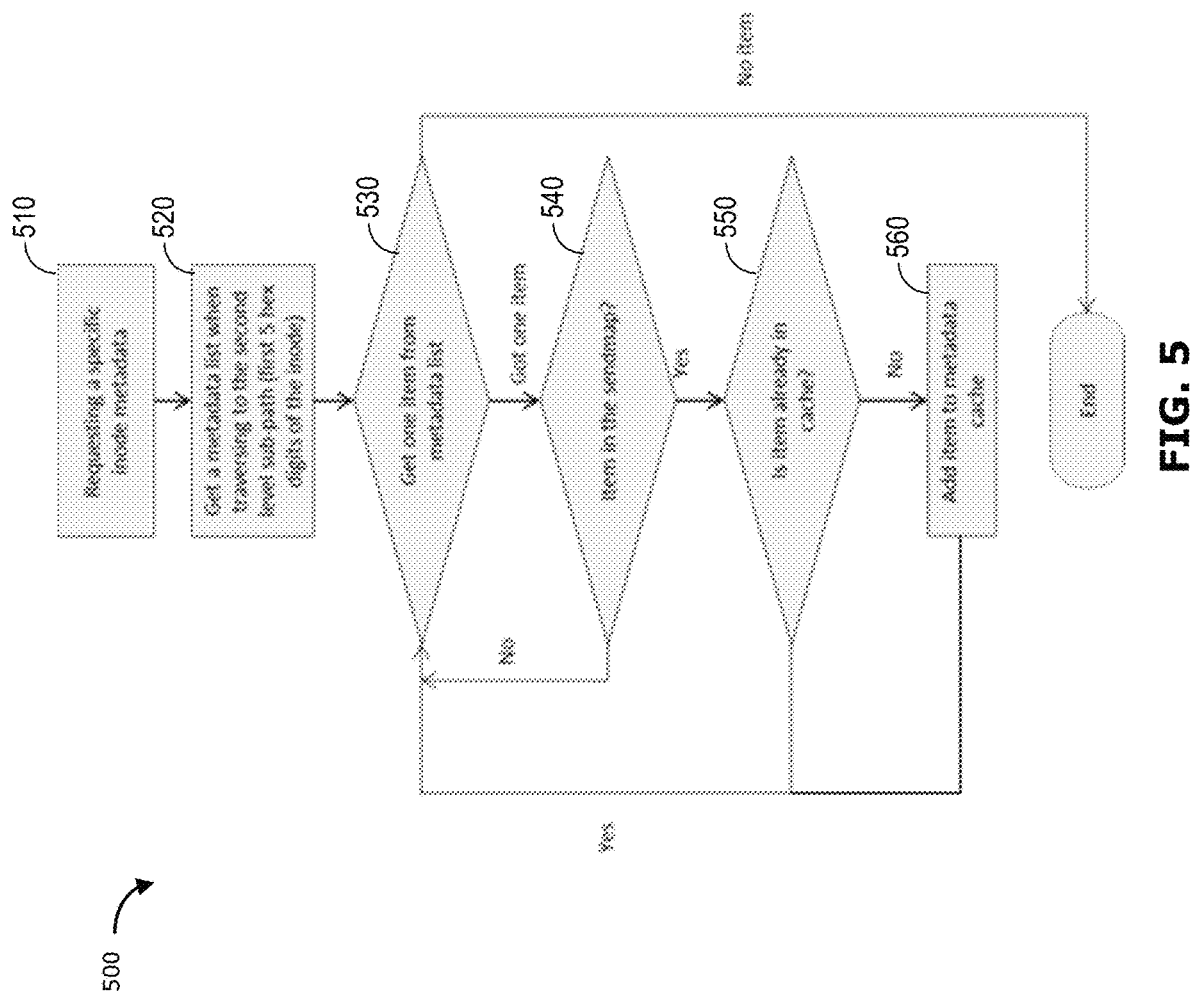
FIG. 5 is a flowchart illustrating an example method for generating a metadata cache, according to one embodiment of the disclosure.

Referring to FIG. 5, a flowchart illustrating an example method 500 for generating a metadata cache, according to one embodiment of the disclosure, is shown. At block 510, metadata associated with a specific inode number may be requested. The requested metadata is not available from the metadata cache. At block 520, a metadata inode list that contains the requested inode and other inodes that share the same first 5 hex digits in their inode numbers may be obtained through a traversal to the second level sub-path of the file/directory tree (which corresponds to the first 5 hex digits of the inode numbers). At block 530, one inode in the list obtained at block 520 may be processed, unless all inodes in the list have been processed, in which case the method 500 ends. At block 540, whether the inode being processed is selected may be determined based on the sendmap. If it is selected, at block 550, it may be determined whether the inode number and its associated metadata are already stored in the metadata cache. On the other hand, if the inode being processed is not selected, the process returns to block 530 to process the next inode in the list. If it is determined at block 550 that the selected inode is not already cached in the metadata cache, at block 560, the inode number and its associated metadata are added to the metadata cache. If it is determined at block 550 that the selected inode is already stored in the metadata cache, the process returns to block 530 to process the next inode in the list. After the new entry is added to the metadata cache at block 560, the process returns to block 530 to process the next inode in the list.

Method 500 may be performed by processing logic that includes hardware (e.g. circuitry, dedicated logic, etc.), software (e.g., embodied on a non-transitory computer readable medium), or a combination thereof. For example, method 500 may be performed by processors 1501 of FIG.

6. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, embodiments of the disclosure are related to an improved method for restoring an inode based backup to a path based structure. Based on the path to be restored, file and directory selection may be determined, and the inode tree may be pruned based on the file and directory selection to save processing time and memory usage. The metadata to be used in the restoration process may be predicted, and a memory-efficient bitmap structure called sendmap is used to record the selected inodes that are associated with the useful metadata. Based on the sendmap, a metadata cache may be generated to cache the metadata to be used in the restoration process and the associated inode numbers. The metadata cache reduces the number of times the file or directory tree needs to be traversed, and reduces unnecessary processing of inodes that are not useful in the restoration process, thereby improving the speed of the restoration process. Significant restoration performance improvements have been observed in experiments.

Figure 6:
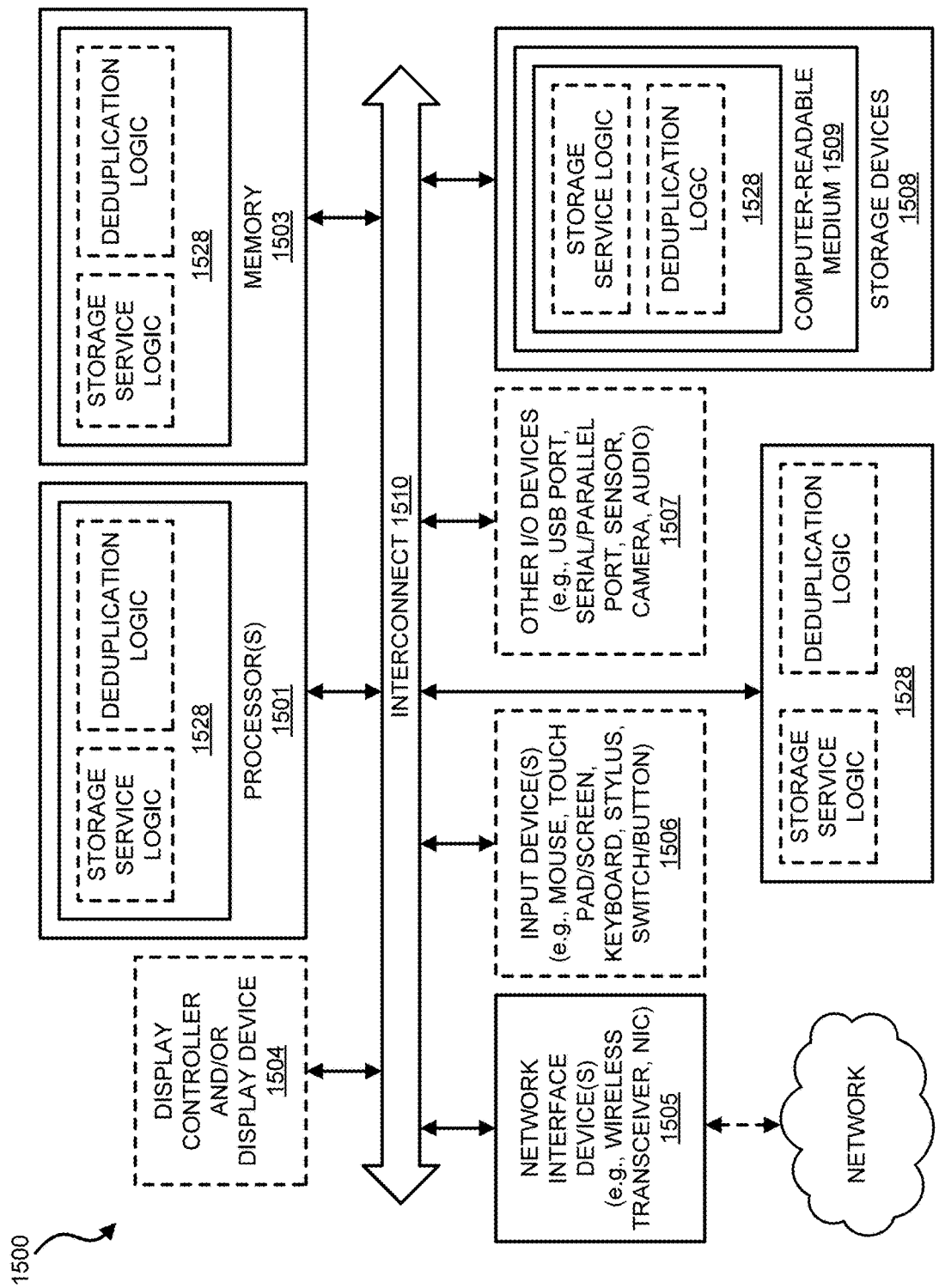
FIG. 6 is a block diagram illustrating an example of a data processing system which may be used with one embodiment of the disclosure.

FIG. 6 is a block diagram illustrating an example of a data processing system 1500 which may be used with one embodiment of the disclosure. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for restoring an inode based backup to a path based structure, comprising:
   receiving a path encompassing one or more files or directories (files/directories) to be restored;
   selecting one or more inodes when metadata associated with each of the one or more inodes is to be used in a restoration;
   determining, in the inode based backup, one or more selected inodes that correspond to the files/directories to be restored and one or more unselected inodes that correspond to one or more files/directories that are not in the path and not to be restored, wherein metadata associated with the one or more selected inodes is to be used in the restoration, wherein metadata associated with the unselected inodes is not to be used in the restoration;
   generating a sendmap structure that is indicative of the selected inodes and the unselected inodes, wherein the sendmap structure includes a bitmap structure to store status of file/directories inode selection for the restoration, wherein generating the sendmap structure comprises:
      traversing from a root folder to the path to determine inode numbers of the files/directories to be restored, the traversing includes searching a directory tree to determine the inode numbers and names of child files and subdirectories, wherein each bit of the sendmap structure corresponds to an inode, and a bit value of the sendmap structure indicates whether a corresponding inode is selected or unselected;
   restoring a first file of the files/directories to be restored from the inode based backup to the path based structure;
   determining whether an inode number of the first file, which identifies a first inode of the first file, and associated metadata of the inode number are available in a metadata cache, and if so: using the inode number of the first file and the associated metadata in the metadata cache in the restoration of the first file; and
   adding the inode number of the first file and the associated metadata to the metadata cache when the inode number of the first file and the associated metadata are not available in the metadata cache.

2. The method of claim 1, wherein if the inode number of the first file and the associated metadata are not available in the metadata cache:
   retrieving the inode number of the first file and the associated metadata from an inode file tree;
   determining whether any other inode that shares a second level sub-path with the inode of the first file in the inode file tree is a selected inode based on the sendmap structure; and
   in response to determining that one or more other inodes that share the second level sub-path with the inode of the first file in the inode file tree are selected inodes, storing the one or more other inodes and associated metadata of the one or more other inodes in the metadata cache.

3. The method of claim 2, wherein an inode of a second file of the files/directories to be restored shares the second level sub-path with the inode of the first file when the inode of the second file and the inode of the first file share the first 5 hex digits (20 bits) in respective inode numbers of the inodes of the first and the second files.

4. The method of claim 1, wherein the path based structure is a Linux file system or a Windows file system.

5. The method of claim 1, wherein the sendmap structure is stored in a memory.

6. The method of claim 1, wherein the inode number is a 32-bit unsigned integer.

7. The method of claim 1, wherein the metadata cache is a mapping structure that stores inode numbers and respective associated metadata of the inode numbers.

8. The method of claim 1, further comprising clearing the sendmap structure and the metadata cache when the restoration is completed.

9. A non-transitory machine-readable medium having instructions stored therein which, when executed by a processor, cause the processor to perform restoration operations, the operations comprising:
   receiving a path encompassing one or more files or directories (files/directories) to be restored;
   selecting one or more inodes when metadata associated with each of the one or more inodes is to be used in a restoration;
   determining, in an inode based backup, one or more selected inodes that correspond to the files/directories to be restored and one or more unselected inodes that correspond to one or more files/directories that are not in the path and not to be restored, wherein metadata associated with the one or more selected inodes is to be used in the restoration, wherein metadata associated with the unselected inodes is not to be used in the restoration;
   generating a sendmap structure that is indicative of the selected inodes and the unselected inodes, wherein the sendmap structure includes a bitmap structure to store status of file/directories inode selection for the restoration, wherein generating the sendmap structure comprises:
      traversing from a root folder to the path to determine inode numbers of the files/directories to be restored, the traversing includes searching a directory tree to determine the inode numbers and names of child files and subdirectories, wherein each bit of the sendmap structure corresponds to an inode, and a bit value of the sendmap structure indicates whether a corresponding inode is selected or unselected;
   restoring a first file of the files/directories to be restored from the inode based backup to a path based structure;
   determining whether an inode number of the first file, which identifies an inode of the first file, and associated metadata of the inode number are available in a metadata cache, and if so: using the inode number of the first file and the associated metadata in the metadata cache in the restoration of the first file; and
   adding the inode number of the first file and the associated metadata to the metadata cache when the inode number of the first file and the associated metadata are not available in the metadata cache.

10. The non-transitory machine-readable medium of claim 9, wherein if the inode number of the first file and the associated metadata are not available in the metadata cache:
   retrieving the inode number of the first file and the associated metadata from an inode file tree;
   determining whether any other inode that shares a second level sub-path with the inode of the first file in the inode file tree is a selected inode based on the sendmap structure; and in response to determining that one or more other inodes that share the second level sub-path with the inode of the first file in the inode file tree are selected inodes, storing the one or more other inodes and associated metadata of the one or more other inodes in the metadata cache.

11. The non-transitory machine-readable medium of claim 10, wherein an inode of a second file of the files/directories to be restored shares the second level sub-path with the inode of the first file when the inode of the second file and the inode of the first file share the first 5 hex digits (20 bits) in respective inode numbers of the inodes of the first and the second files.

12. The non-transitory machine-readable medium of claim 9, wherein the path based structure is a Linux file system or a Windows file system.

13. The non-transitory machine-readable medium of claim 9, wherein the sendmap structure is stored in a memory.

14. The non-transitory machine-readable medium of claim 9, wherein the inode number is a 32-bit unsigned integer.

15. The non-transitory machine-readable medium of claim 9, wherein the metadata cache is a mapping structure that stores inode numbers and respective associated metadata of the inode numbers.

16. The non-transitory machine-readable medium of claim 9, the operations further comprising clearing the sendmap structure and the metadata cache when the restoration is completed.

17. A data processing system, comprising:
a processor; and
a memory coupled to the processor storing instructions which, when executed by the processor, cause the processor to perform restoration operations, the operations including:
receiving a path encompassing one or more files or directories (files/directories) to be restored;
selecting one or more inodes when metadata associated with each of the one or more inodes is to be used in a restoration;
determining, in an inode based backup, one or more selected inodes that correspond to the files/directories to be restored and one or more unselected inodes that correspond to one or more files/directories that are not in the path and not to be restored, wherein metadata associated with the one or more selected inodes is to be used in the restoration, wherein metadata associated with the unselected inodes is not to be used in the restoration;
generating a sendmap structure that is indicative of the selected inodes and the unselected inodes, wherein the sendmap structure includes a bitmap structure to store status of file/directories inode selection for the restoration, wherein generating the sendmap structure comprises:

traversing from a root folder to the path to determine inode numbers of the files/directories to be restored, the traversing includes searching a directory tree to determine the inode numbers and names of child files and subdirectories, wherein each bit of the sendmap structure corresponds to an inode, and a bit value of the sendmap structure indicates whether a corresponding inode is selected or unselected;
restoring a first file of the files/directories to be restored from the inode based backup to a path based structure;
determining whether an inode number of the first file, which identifies an inode of the first file, and associated metadata of the inode number are available in a metadata cache, and if so: using the inode number of the first file and the associated metadata in the metadata cache in the restoration of the first file; and
adding the inode number of the first file and the associated metadata to the metadata cache when the inode number of the first file and the associated metadata are not available in the metadata cache.

18. The data processing system of claim 17, wherein if the inode number of the first file and the associated metadata are not available in the metadata cache:
retrieving the inode number of the first file and the associated metadata from an inode file tree;
determining whether any other inode that shares a second level sub-path with the inode of the first file in the inode file tree is a selected inode based on the sendmap structure; and
in response to determining that one or more other inodes that share the second level sub-path with the inode of the first file in the inode file tree are selected inodes, storing the one or more other inodes and associated metadata in the metadata cache of the one or more other inodes.

19. The data processing system of claim 18, wherein an inode of a second file of the files/directories to be restored shares the second level sub-path with the inode of the first file when the inode of the second file and the inode of the first file share the first 5 hex digits (20 bits) in respective inode numbers of the inodes of the first and the second files.

20. The data processing system of claim 17, wherein the path based structure is a Linux file system or a Windows file system.

21. The data processing system of claim 17, wherein the sendmap structure is stored in a memory.

22. The data processing system of claim 17, wherein the inode number is a 32-bit unsigned integer.

23. The data processing system of claim 17, wherein the metadata cache is a mapping structure that stores inode numbers and respective associated metadata of the inode numbers.

24. The data processing system of claim 17, the operations further comprising clearing the sendmap structure and the metadata cache when the restoration is completed.

* * * * *